United States Patent [19]

Lang-Ree

[11] 4,012,274
[45] Mar. 15, 1977

[54] SPLICER FOR HEAT COHERING BELTS

[75] Inventor: Nils Lang-Ree, Los Altos, Calif.

[73] Assignee: N.P.I. Corporation, Burlingame, Calif.

[22] Filed: Oct. 17, 1975

[21] Appl. No.: 623,366

[52] U.S. Cl. .............................. 156/502; 93/DIG. 1; 100/93 P; 100/211; 156/544; 156/583

[51] Int. Cl.² ................. B30B 15/06; B30B 15/34; B65H 69/08

[58] Field of Search .......... 156/502, 583, 503, 507, 156/544, 580, 157; 100/93 P, 211, 295, 296; 93/DIG. 1

[56] References Cited

UNITED STATES PATENTS

| | | | |
|---|---|---|---|
| 2,745,463 | 5/1956 | Rempel | 156/583 |
| 3,000,434 | 9/1961 | Nelson et al. | 156/502 |
| 3,012,601 | 12/1961 | Lee | 156/583 |
| 3,321,353 | 5/1967 | Zelnick | 156/583 |
| 3,687,786 | 8/1972 | Williams et al. | 156/502 |
| 3,707,428 | 12/1972 | Roberts | 156/583 |

Primary Examiner—Charles E. Van Horn
Assistant Examiner—M. G. Wityshyn
Attorney, Agent, or Firm—Lothrop & West

[57] ABSTRACT

A splicer for a heat cohering belt has a base supporting a lower platen frame. A heated lower platen is vertically liftable in the lower platen frame by means of an expansible envelope therebetween. An upper platen frame on the base supports a heated upper platen for movement toward and away from the lower platen. A rotatable cam on the base is effective to lift the upper platen, and a bail on the base is effective to hold the upper platen against lifting above a chosen point. Both platens are centrally supported for expansion in two directions away therefrom, and the lower platen is made flexible by a number of transverse gaps therein.

3 Claims, 3 Drawing Figures

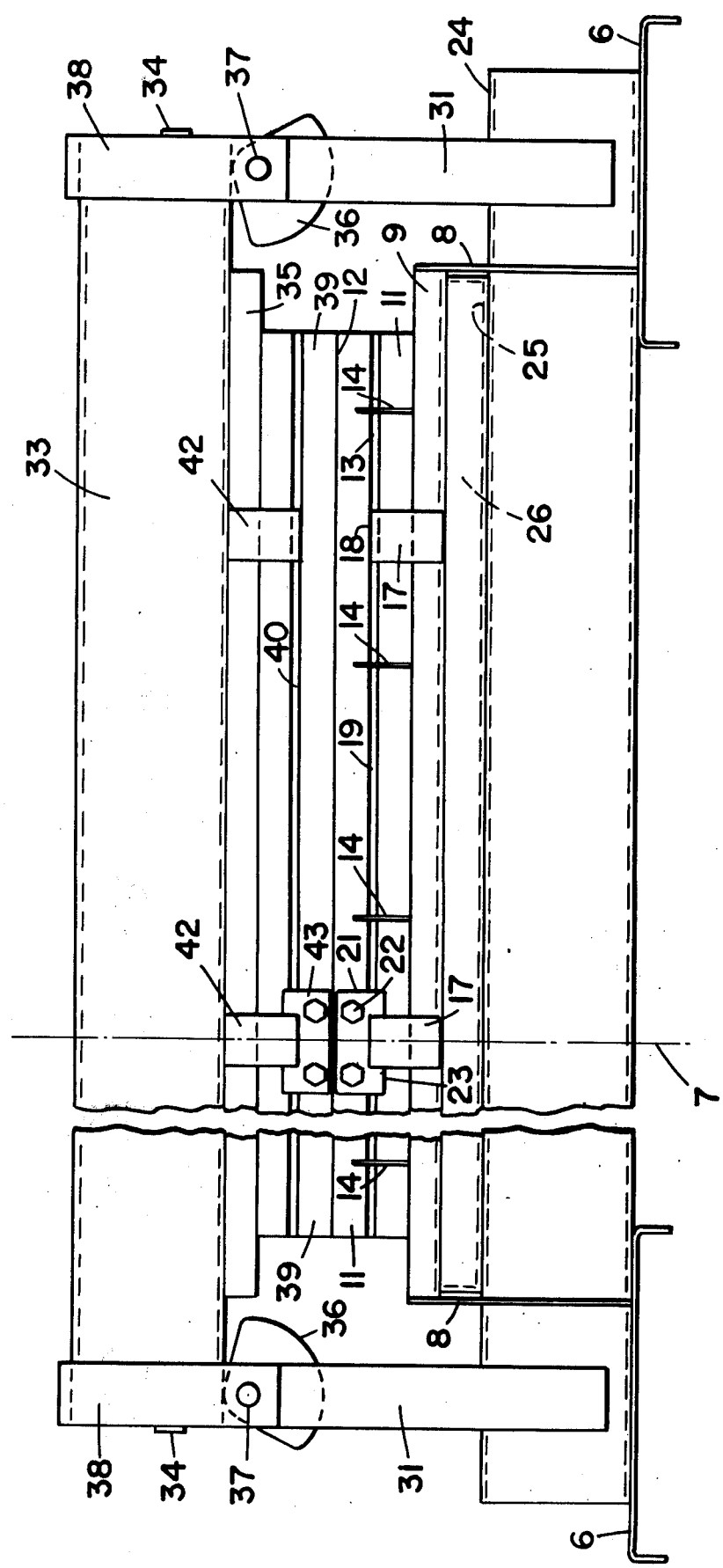
FIG_1

U.S. Patent    Mar. 15, 1977    Sheet 2 of 2    4,012,274
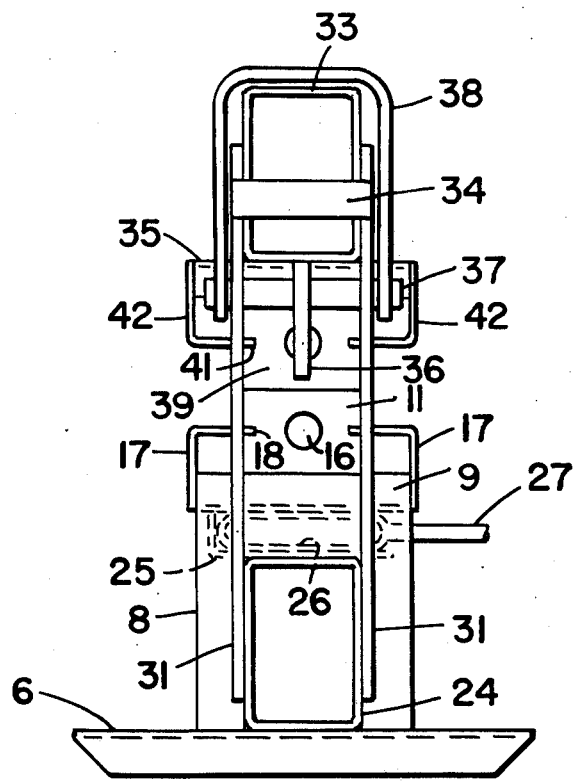
FIG_2
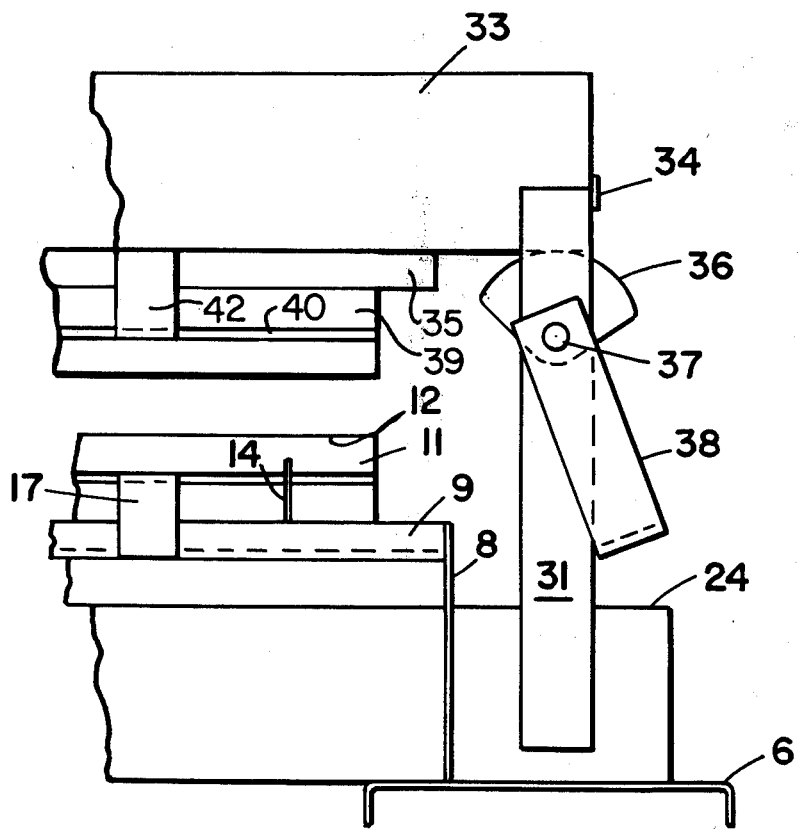
FIG_3

SPLICER FOR HEAT COHERING BELTS

A number of machines, particularly machines for use in preparing and especially cooking food articles, are provided with renewable conveyor belts made of plastic material. The ends of a plastic strip are attached to each other by heating overlapping portions of the belts, which merge or cohere to form a complete belt loop. In some environments the belts must be quite frequently changed. It is appropriate and economical to have a supply of belt material in strip form available and, when needed, to place the ends of a cut-off portion of the strip in overlapping relationships and to cohere the overlapped ends on the job and even on the machine.

it is therefore an object of the invention to provide a device for heat cohering belts.

Another object of the invention is to provide such a machine that can be utilized at the site of belt use.

A further object of the invention is to provide such a device which can easily and readily be operated by relatively unskilled users.

A further object of the invention is to provide a splicer that is effective to provide a generally strong and uniformly effective splice transversely of the belt.

Another object of the invention is to make sure that appropriate heat and pressure are promptly available for ensuring the provision of a completely cohered seal at the belt ends.

Another object of the invention is in general to provide an improved splicer for cohering belt strip materials.

Other objects, together with the foregoing, are attained in the embodiment of the invention described in the accompanying description and illustrated in the accompanying drawings, in which:

FIG. 1 is a front elevation of a splicer for belts showing the mechanism in a closed or sealing position;

FIG. 2 is an end elevation of the structure shown in FIG. 1; and

FIG. 3 is a detail showing part of the lifting mechanism in upper position.

The current device is described in one of its present more prominent fields of use, although the mechanism has utility in a large number of different fields. In the present case, the arrangement is designed to perform a splicing operation on a belt made of a strip of plastic material which is folded to have its otherwise free ends overlapped for a substantial distance; for example, about 2 inches, and entirely across the belt, which is of the order of 26 inches wide. The thickness of the material usually utilized is several mils, but the width and thickness of the material may vary substantially.

Pursuant to the invention there is provided a base 6 designed to rest on any suitable support, primarily including rails or frame members or the like of a machine, on which a belt may be assembled. Alternatively, the base can simply rest on any generally level horizontal support. The base 6, like the rest of the machine, is entirely symmetrical about a central axis 7, or plane, so that a description of mechanism on one side of the center applies equally to comparable mechanism on the other side thereof.

Included in the base and upstanding therefrom are supporting guides 8 forked at their lower ends and at their upper ends carrying a transverse lower platen frame 9 or tray conveniently fabricated of bent sheet metal extending entirely across the mechanism, closed on its sides and ends but open at its top. The tray preferably contains thermal insulation.

Resting on the lower platen frame 9 is a lower platen 11. This is a metallic or other good thermally conducting body having a generally planar top surface 12 and having a pair of longitudinally extending grooves 13 along its sides. The lower platen fits into the tray or frame 9 for motion therewith. The lower platen at intervals along its length is provided with a number of spaced gaps 14. These usually take the form of transverse saw cuts from the bottom through part of the metal of the platen. The gaps are effective to make the lower platen longitudinally somewhat flexible. The upper surface 12 can take on a curved or arcuate or undulatory character when seen in front elevation.

The lower platen 11 is provided with an internal heating unit 16, usually an electrical coil connected to an electrical source by means not shown. The platen is easily heated and cooled. As its temperature increases or decreases it is free to expand or contract longitudinally. This is allowed by securing clips 17 provided at intervals along the platen length. At their lower ends the clips are secured to the frame 9 and at their upper ends have long and somewhat flexible inturned flanges 18 resting freely in longitudinal grooves 19 in the platens sides. In this fashion the lower platen is secured against lifting movement or lowering movement with respect to the frame, although some undulatory motion is permitted because of the springiness of the flanges 18. Thus when the lower platen is heated and cooled it can expand or contract freely and increase or decrease its longitudinal dimension without in any wise imposing a strain on its platen frame and can expand and contract vertically by flexure of the clip flanges.

In order to centralize the lower platen during expansion and contraction, the central clip 17 and the platen are held against relative endwise movement by means of a restraining plate 21 secured by machine screws 22 to the platen and having lugs 23 lying either side of the central clip 17. The central clip 17, being firmly secured to the lower platen frame 9, acts as a fixed or datum point.

Disposed between the main beam 24 of the base 6 and the lower portion of the lower platen frame is an open top housing 25 containing an expansible envelope 26 or bag of flexible material having a connection 27 to any suitable source of pressure fluid such as liquid or air under pressure and controlled by the customary supply and discharge valve, not shown. When the envelope is under substantially no pressure, the lower platen 11 is in a lowermost position with respect to the base 6, but when the envelope is pressurized and expanded its vertical dimension changes. The expansion tends to lift the lower platen frame 9 and the lower platen 11 into a higher position. The vertical or substantially vertical movement of the lower platen is guided by the forked end plates 8 secured at their upper ends to the ends of the lower platen frame 9 and straddling the main beam 24 for sliding interengagement therewith.

The main base beam 24 at each end is provided with a pair of upright guide straps 31. Between each pair there is disposed an upper frame beam 33 vertically slidable with respect to the straps but laterally confined therebetween and loosely confined endwise by a bar 34 extending across the straps 31.

At each end the upper frame beam 33 rests by gravity upon a quadrant cam 36 secured to a cross shaft 37 journalled in the straps 31. The shaft 37 is also fastened to a U-shaped bail 38. In one position of the cam, as shown in FIG. 1, the beam 33 is in a lowermost position. When the cam is rotated through approximately a half turn from the position shown, the beam 33 is lifted up by the cam and occupies a high position. In the high position of the cam, the bail is low and out of the way, but when the cam is rotated through approximately 180° from the high position into the low position, as shown in full lines, the bail 38 then overlies the extreme end of the main upper beam 33 and prevents such beam from rising appreciably.

The upper beam 33 is part of an upper platen frame 35 carrying a heated upper platen 39 quite comparable to the lower platen 11 except that the upper platen is relatively rigid or stiff, although perhaps slightly flexible, and does not have any cuts or other gaps to make it more flexible. The upper platen is heated from the same electrical source as is the lower platen. Both platens can be provided with similar thermal insulation. The upper platen is formed with a pair of lateral or side grooves 40 into which the flanged ends 41 of appropriate clips 42 project. The clips 42 at their upper ends are secured to the upper beam 33 but are slightly loose in the grooves 40 to allow expansion and contraction of the upper platen away from a central datum point. This is established by a plate 43 like the plate 21 and fastened to the center of the upper heated platen to embrace the sides of the central clip 42. The upper heated platen is thus free to expand and contract away from and toward the center line or axis 7.

In the use of this device and starting from the positions shown in FIGS. 1 and 2, the envelope 26 is relieved of pressure and the electrical circuit is completed to the heaters in the upper and lower platens 11 and 39. Their temperature increases to a point effective to soften or even melt the material of the belt strip to be worked on. The shaft 37 is positioned so that the bail 38 is in its lower position and so that the cam 36 positions the upper platen 39 in its upper position. Stated differently, the duplicate cams at the opposite ends of the upper frame beam 33 support the beam in an upper position to allow a large space or gap between the upper platen 39 and the lower platen 11. The facing surface of the two platens are thus completely exposed and readily available.

The two free ends of the belt strip are overlapped within the space between the upper and lower platens. The bails 38 are then rotated not only to rotate the cams 36 and thus lower the upper frame beam 33, but also to position the bails 38 in locations overlying and approximately engaging the ends of the upper beam 33. During this operation, the upper platen 39 descends by gravity toward the lower platen 11 but stops lightly in contact with the overlapped belt ends or just above them. A compact package of the upper platen 39, the lower platen 11 and the two belt ends is thus afforded.

At this time the pressure within the previously collapsed envelope 26 is substantially increased. The envelope then expands and lifts the lower platen 11 to apply pressure to the belt ends and against the upper platen 39 as restrained against lifting by the bails. Since the belt ends may not be entirely regular in configuration and since the thickness of the material may vary somewhat and since there may be some small warpage or deviation from planar conditions in either or both of the platens, the pressure exerted by the envelope when inflated is exerted through the relatively flexible lower platen 11. This therefore conforms to or agrees with the configuration of the upper platen and the intervening belt ends.

In this fashion the pressure exerted all over the overlapped belt ends is as nearly uniform as may be necessary. It has been found that non-uniform pressure results in portions of the overlapped belt ends being cohered or sealed together, whereas other portions are not well sealed or may not be sealed or cohered at all. With the flexible lower platen, however, and by utilizing the expansible envelope, which exerts substantially uniform pressure throughout its area, there is afforded a very nearly uniform pressure on the intervening overlapped belt ends. In practice, they cohere well over substantially the entire area. The heat and pressure on the overlapped ends are continued long enough to afford good cohesion and a continuous belt.

When the heating and pressing time has expired, the bails 38 are reverse rotated, thus freeing the upper beam 33 and causing the cams 36 to lift the beam and the upper platen 39 away from the lower platen 11, leaving a substantial gap therebetween. The upper beam 33 can then be manually grasped and lifted out of the way so that the belt loop can be removed from the splicer. The job is thus completed.

What is claimed is:

1. A splicer for heat cohering belts comprising a base including an elongated lower platen frame; a lower, flexible elongated platen on said lower platen frame, said lower platen being a thermally conducting bar having transverse gaps extending partially therethrough from the bottom thereof; a first heater in said lower platen; an elongated upper platen frame; an upper, rigid, elongated platen on said upper platen frame; a second heater in said upper platen; means including a shaft rotatable on said base and a cam fixed on said shaft and engaging said upper platen frame for moving said upper platen toward and away from said lower platen; means including a bail fixed on said shaft for holding said upper platen in a fixed position; an expansible means between said base and said lower platen for forcing said lower platen toward said upper platen, and means secured to the center only of said lower platen frame and to the center only of said lower platen for holding the center of said lower platen at the center of said lower platen frame.

2. A splicer as in claim 1 in which at least one of said platens has means forming a groove extending longitudinally in one edge thereof, and a clip secured to the adjacent platen frame and having a flanged end projecting loosely into said groove.

3. A splicer as in claim 2 in which said flanged end is flexible.

* * * * *